Figure 1:
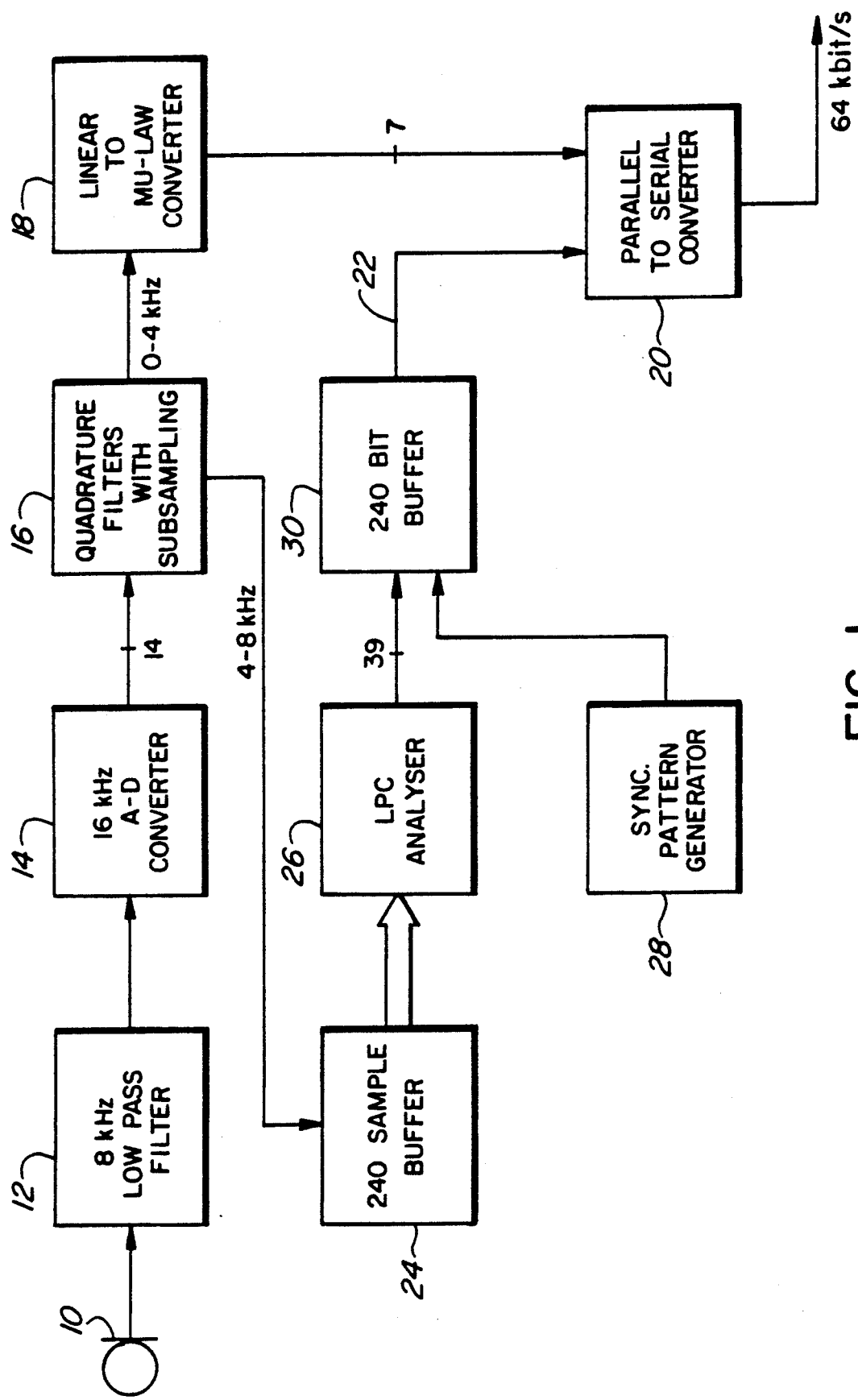

United States Patent [19]

Ellis et al.

[11] Patent Number: 5,068,899
[45] Date of Patent: Nov. 26, 1991

[54] TRANSMISSION OF WIDEBAND SPEECH SIGNALS

[75] Inventors: John G. Ellis; Bruce L. Townsend, both of Nepean, Canada

[73] Assignee: Northern Telecom Limited, Montreal, Canada

[21] Appl. No.: 721,091

[22] Filed: Apr. 8, 1985

[51] Int. Cl.$^5$ .......................... G10L 3/02; H04J 3/12; H04B 1/66
[52] U.S. Cl. .................................. 381/31; 370/110.1
[58] Field of Search .................................. 381/29–40; 370/110.1, 111

[56] References Cited

U.S. PATENT DOCUMENTS

| | | | |
|---|---|---|---|
| 3,686,443 | 8/1972 | Kavanaugh et al. | 370/110.1 |
| 3,790,715 | 2/1974 | Inose et al. | 370/110.1 |
| 3,970,799 | 7/1976 | Colton et al. | 370/110.1 |
| 4,131,765 | 12/1978 | Kahn | 381/33 |
| 4,622,680 | 11/1986 | Zinser | 381/31 |
| 4,625,286 | 11/1986 | Papamichalis et al. | 381/36 |
| 4,703,480 | 10/1987 | Westall et al. | 381/31 |
| 4,704,730 | 11/1987 | Turner et al. | 381/36 |

Primary Examiner—Dale M. Shaw
Assistant Examiner—David D. Knepper
Attorney, Agent, or Firm—R. John Haley

[57] ABSTRACT

Speech signal components in a high band of frequencies between 4 and 8 kHz are transmitted via a digital transmission channel, which carries speech signal samples at frequencies below 4 kHz and sampled at a rate of 8 kHz, by replacing the least significant bit of the samples with bits of information derived from the high band by linear predictive coding. These information bits are transmitted in frames, each frame comprising a synchronizing bit and bits representing the power of and a set of filter coefficients for the high band signal components occurring in a period corresponding to the frame duration. Each such bit is transmitted redundantly three or six times in view of bit stealing techniques already used for signalling on digital transmission links. The resulting wideband speech signal transmission is compatible with existing limited bandwidth voice channel transmission arrangements.

17 Claims, 5 Drawing Sheets

TRANSMISSION OF WIDEBAND SPEECH SIGNALS

This invention relates to a method of and apparatus for transmitting wideband signals via a digital switched (e.g. telephone) network.

It is well known that the bandwidth of speech signals transmitted over switched telephone networks is limited to a range of about 200 Hz to about 3.5 kHz. This limited bandwidth presents a distinct problem in that speech signals restricted to this bandwidth are less intelligible than is desirable for conversation. In particular, it is desirable also to transmit speech signal components at higher frequencies, for example up to at least about 6 kHz, for enhanced voice quality and intelligibility.

For digital transmission, speech signals are sampled at a frequency of 8 kHz and the samples are converted, e.g. using a mu-law or A-law coding scheme, into 8 bits for each sample for transmission on a 64 kbit/s digital transmission channel. In this case again the speech signals have the same limited bandwidth.

It has been recognized that, with end-to-end digital transmission, the 64 kbit/s channel can be used with a different coding scheme to provide enhanced speech quality. For example, schemes have been proposed which use ADPCM (adaptive differential pulse code modulation) coding to transmit speech signals in a bandwidth of about 8 kHz on a 64 kbit/s channel. However, such coding schemes are not compatible with conventional, for example mu-law, coding schemes. In consequence, if such coding schemes are used on existing digital switching networks to which conventional telephone sets (or voice-band terminals) are connected, the digital switches must recognize such telephone sets or terminals as being incompatible for various purposes such as voice bridging and tone insertion.

An object of this invention, therefore, is to provide an improved method of and apparatus for transmitting relatively wideband signals via a digital switched network, which is compatible with existing coding and switching arrangements.

According to one aspect of this invention there is provided a method of transmitting signal components in a high band of frequencies, above a predetermined frequency, via a digital transmission channel which carries signal components in a low band of frequencies, below the predetermined frequency, comprising the steps of: deriving bits of information relating to the high band signal components; and transmitting said bits of information in place of the least significant bit of the samples.

Advantageously said bits of information relating to the high band signal components are transmitted in frames each comprising a frame synchronizing bit and a plurality of information bits, each frame having a predetermined duration and the information bits in each frame relating to high band signal components which occur during a period corresponding to said predetermined duration.

Conveniently the plurality of information bits in each frame comprise bits representing a plurality of filter coefficients, produced by linear prediction coding of the high band signal components, and bits representing a power level of the high band signal components.

Preferably the predetermined frequency is 4 kHz and the digital transmission channel has a bit rate of 64 kbit/s.

Thus an embodiment of the method of the invention uses "bit stealing" techniques to provide, in place of the least significant bit of each sample of speech signal components below 4 kHz, i.e. of a conventional voice channel signal, an 8 kbit/s transmission channel for transmission of high band signal component information.

As bit stealing techniques are already used for signalling purposes on digital transmission links, loss of the high band signal component information during transmission is desirably avoided by transmitting each of the high band information bits redundantly in place of the least significant bit of a plurality of, preferably three or six, consecutive samples.

The invention also extends to a method of transmitting components, at frequencies above 4 kHz, of a speech signal via a digital transmission channel via which samples of the speech signal at a sampling rate of 8 kHz are transmitted, comprising the step of replacing a least significant bit of each sample with a bit of information derived from the speech signal components at frequencies above 4 kHz.

According to another aspect this invention provides apparatus for transmitting via a digital transmission channel signal components of a speech signal in high and low bands of frequencies, respectively, above and below a predetermined frequency, comprising: means for producing digital samples of speech signal components in the low band at a sampling rate of twice the predetermined frequency for transmission via the digital transmission channel, each sample comprising a plurality of bits including a least significant bit; means for producing bits of information relating to speech signal components in the high band; and means for replacing the least significant bit of each sample with a bit of information relating to speech signal components in the high band.

Figure 2:
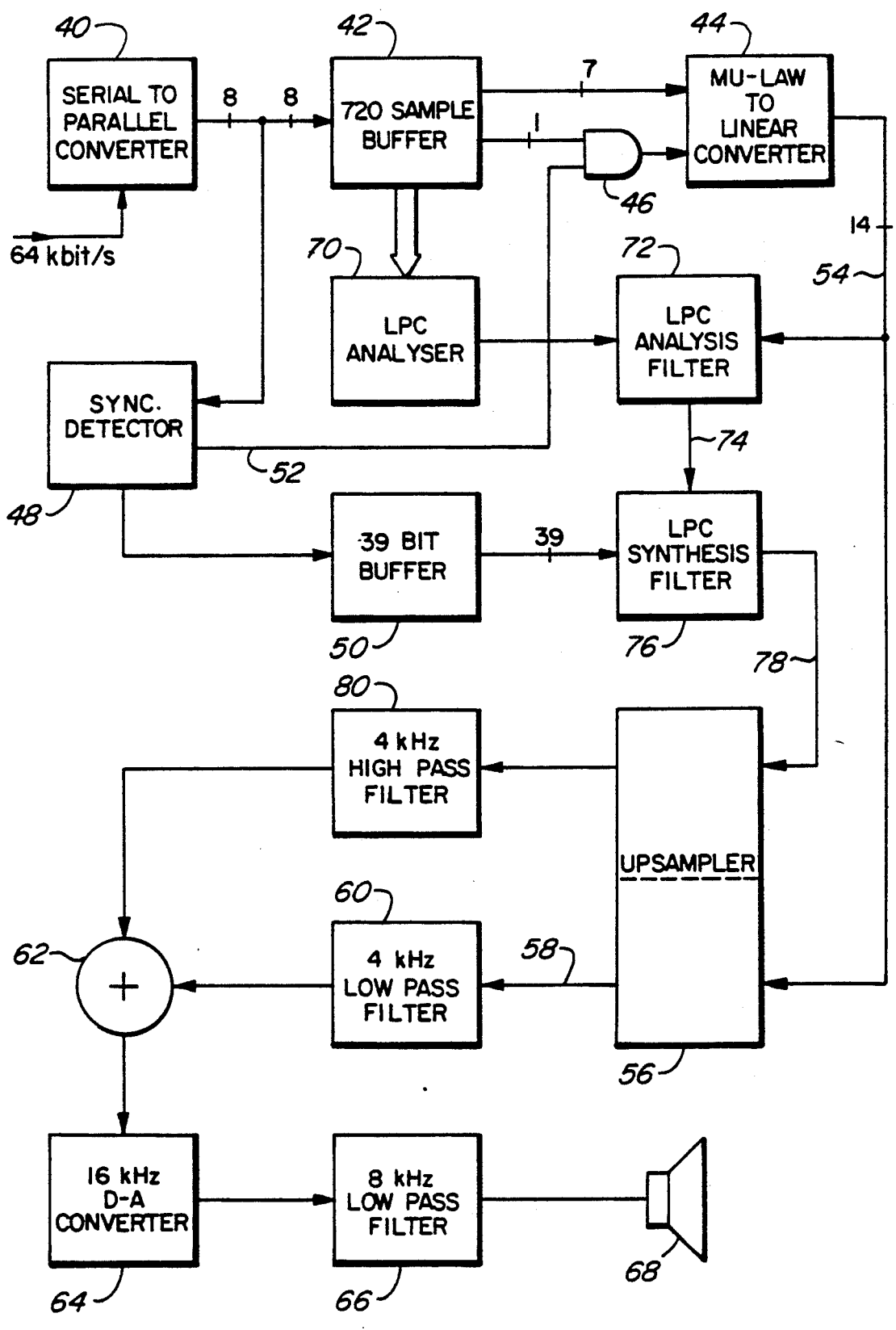

The invention will be further understood from the following description with reference to the accompanying drawings, in which:

FIG. 1 schematically illustrates in a block diagram a transmitter for transmitting a digital signal encoded in accordance with an embodiment of the invention;

FIG. 2 schematically illustrates in a block diagram a receiver for receiving and decoding the encoded digital signal; and FIGS. 3 to 7 illustrate by way of example spectra of signals which may occur in operation of the transmitter and receiver and with reference to which the operation of these are explained.

In FIGS. 1 and 2, some of the signal lines between blocks are multiple lines in parallel for carrying a plurality of bits in parallel. Accordingly, some of the signal lines are shown conventionally as a single line with a bar and an adjacent number showing the actual number of lines.

Referring to FIG. 1, a speech signal derived, for example, from a microphone 10 is band limited to a frequency of 8 kHz by passing it through an 8 kHz low pass filter 12. The band limited speech signal is converted into a digital signal having 14 bits per sample by an analog to digital converter 14 having a sampling rate of 16 kHz, this frequency being twice the highest frequency of the band limited speech signal.

The digital speech signal is split into two frequency bands, namely a band from 0 to 4 kHz and a band from 4 to 8 kHz referred to herein as the low and high bands respectively, by quadrature mirror filters 16. Because each of these bands has a bandwidth of only 4 kHz but the samples occur at a rate of 16 kHz, every second sample in each of the bands is redundant and accordingly is ignored in this filtering process, thereby providing a 2:1 subsampling (also known as downsampling) of the digital signal in each band.

The low band of the digital speech signal is converted into a mu-law encoded digital signal by a linear to mu-law converter 18 which operates in a known manner. The converter 18 produces from its 14-bit digital speech signal input an 8-bit output signal, of which the seven most significant bits are supplied to the 7 most significant bit inputs of an 8-bit parallel to serial converter 20, which operates in a known manner to produce a 64 kbit/s serial bit stream for transmission on a 64 kbit/s digital transmission channel which is represented by an output of the converter 20. An eighth, least significant, bit input of the converter 20 is supplied via a line 22 as described below.

It should be appreciated from the above description that the low band of the speech signal is transmitted as the 7 most significant bits of a mu-law encoded signal in a 64 kbit/s digital transmission channel, and thus is entirely compatible with conventional mu-law encoded digital transmission arrangements.

The eighth, or least significant, bit of each mu-law encoded signal sample is stolen from the low band transmission to provide an 8 kbit/s transmission channel for the transmission of information relating to the high band of the speech signal. Such bit-stealing techniques are known in themselves for other purposes; for example for transmission of signalling information it is well known to steal the least significant bit of each digital transmission channel in every sixth frame on a T-1 transmission link. This poses the problem, however, that the bit used for the transmission of the high band information is likely to be stolen for the transmission of signalling information, whereby the high band information will not be received at the far end of the digital transmission network. This problem is exacerbated by the fact that the 64 kbit/s signal produced by the converter 20 may pass through several different T-1 transmission links before reaching the far end, and that the different links are unsynchronized relative to one another and so may steal the least significant bits from different frames.

In order largely to avoid this problem, each bit of high band information is transmitted redundantly a total of six times in sequence on the line 22. It has been determined that the resultant 64 kbit/s digital signal must pass through on average 13 individual T-1 transmission links for the probability of at least one of every six redundantly transmitted bits reaching the far end to fall to 0.5. This redundant transmission of bits results in the 8 kbit/s transmission channel for the high band information becoming an effective transmission channel of 1.33 kbit/s.

In order to compress the high band information into this transmission channel, the high band information is transmitted in frames each of which provides information relating to 240 samples of the high band, corresponding to a period of 30 ms. During each 30 ms frame there are 240 least significant bits of the 64 kbit/s signal, and hence 240 bits on the line 22. As described above these 240 bits contain sequences of 6 redundantly transmitted bits, so that each frame contains 40 useful information bits.

Referring again to FIG. 1, the high band samples from the filters 16 are supplied to a buffer 24, which stores the 240 samples of each frame. This frame of samples is subjected to linear predictive coding (LPC) analysis in an LPC analyser 26 to produce 39 bits of information. These 39 bits, and one synchronizing pattern bit per frame which is supplied by a synchronizing pattern generator 28 which may be of known form, constitute the 40 useful information bits per frame for transmission. These 40 bits are stored, each redundantly in 6 sequential locations, in a 240 bit buffer 30 which is read out in each frame to the line 22.

In performing the LPC analysis, each frame is windowed using a Hanning or raised cosine function, and the analysis is performed to give 8 coefficients. Durbins recursion equations are used on the autocorrelation of the windowed frame, and the reflection coefficients produced by the solution of these equations are transformed to log-area coefficients. The ratio of the power of the high band relative to the power of the low band, or alternatively the absolute power level of the high band, provides a power term. For each frame the power term and the 8 coefficients are quantized to a total of 39 bits, for transmission with the synchronizing pattern bit as the 40 bits for the respective frame, using the following bit allocation:

Power term: 5 bits
Coefficient #1: 6 bits
Coefficients #2 to #4: 5 bits each
Coefficients #5 to #6: 4 bits each
Coefficient #7: 3 bits
Coefficient #8: 2 bits It will be noted that the LPC analysis of the high band information in frames in this manner produces a delay in the transmission of this information, whereas the low band signal is not similarly delayed.

Referring now to FIG. 2, there is illustrated a receiver for receiving and decoding a 64 kbit/s digital signal, which may be produced by the transmitter of FIG. 1 or may be a conventional 64 kbit/s digital signal containing no high band information.

In the receiver, the incoming 64 kbit/s serial digital signal is supplied to an 8-bit serial to parallel converter 40, an output to which represents the digital transmission channel. The converter 40 supplies the resultant 8-bit parallel digital signal samples to a first-in first-out buffer 42. The buffer 42 serves to store 720 samples, corresponding to 3 30 ms frames each containing 240 samples as described above. An 8-bit parallel output of the buffer 42 supplies the 7 most significant bits of each sample to the 7 most significant bit inputs of a mu-law to linear converter 44, and supplies the eighth, least significant, bit of each sample to one input of a 2-input AND gate 46 whose output is connected to the least significant bit input of the converter 44.

A synchronizing pattern detector 48 is supplied with the eighth, least significant, bit of each sample from the converter 40 and monitors these eighth bits for the predetermined frame synchronizing pattern in every 240th bit, i.e. in each frame. If the detector 48 detects this pattern it supplies every 6th least significant bit (due to the 6-times redundant transmission) following each synchronizing bit to a buffer 50, which thereby serves to store the 39 high band information bits of each frame. In this case the detector 48 also produces a logic 0 on a line 52 connected to a second input of the AND gate 46, whose output, and hence the 8th bit input to the converter 44, is thereby maintained as a logic 0. If the detector 48 fails to detect the synchronizing pattern, as would be the case for example if the incoming 64 kbit/s digital signal is a conventional voice channel signal containing no frames of high band information, then the detector supplies a logic 1 to the line 52. In this case the gate 46 is enabled to pass the eighth bit of each digital signal sample to the converter 44.

For clarity and convenience of description it is assumed above and in FIG. 2 that the 8-bit digital signal samples are passed through the buffer 42 regardless of whether or not any high band information frames are present, whereby the samples are always delayed for the duration of 720 samples or 3 frames. However, this need not be the case. More particularly, the logic 1 signal on the line 52 can also be used to enable conventional voice channel signals to bypass the buffer 42 whereby they are not subjected to this delay. The buffer 42 serves to delay the low band signal samples to compensate for the delays in the transmitter and receiver in processing the high band information, whereby the two bands when combined as described below are derived from the same time frame.

The mu-law to linear converter 44 produces in known manner 14-bit digital signal samples at a rate of 8 kHz on lines 54. These are supplied to an upsampler 56, which interleaves zero samples with the supplied samples to provide on lines 58 14-bit digital signal samples at an effective sampling rate of 16 kHz. The low band samples on the lines 58 are passed via a 4 kHz low pass filter 60 and a signal combiner 62, mentioned further below, to a digital to analog converter 64 operating at a sampling rate of 16 kHz. The resultant analog signals are supplied via an 8 kHz low pass filter 66 to an output transducer 68 illustrated as a loudspeaker.

Thus low band signals, or conventional voice band signals derived from a digital signal containing no high band information frames, are reproduced. In the event that high band information frames, as detected by the detector 48, are present, the high band is reproduced in the following manner.

The most recent frame (240 samples) stored in the buffer 42 is subjected to LPC analysis, in an LPC analyser 70, in the same manner as is effected in the transmitter except that the resultant coefficients are not quantized. These coefficients are supplied to an LPC analysis filter 72 in which they are used for one frame to filter the low band signal samples on the lines 54 to produce filtered signal samples on lines 74. The filtered signal samples on the lines 74 are supplied to an LPC synthesis filter 76 in which they are filtered in accordance with the power term and coefficients for the respective frame supplied by the buffer 50. The resultant reproduced high band digital signal samples on lines 78 are upsampled to a sampling rate of 16 kHz in the upsampler 56 by interleaving zero samples as described above for the low band, and are passed via a 4 kHz high pass filter 80 to the signal combiner 62, whereby they are added to the low band signals for reproduction with the low band via the converter 64, filter 66, and transducer 68.

The operation of the transmitter and receiver will be further understood by referring to FIGS. 3 to 7, illustrating frequency spectra.

Figure 3:
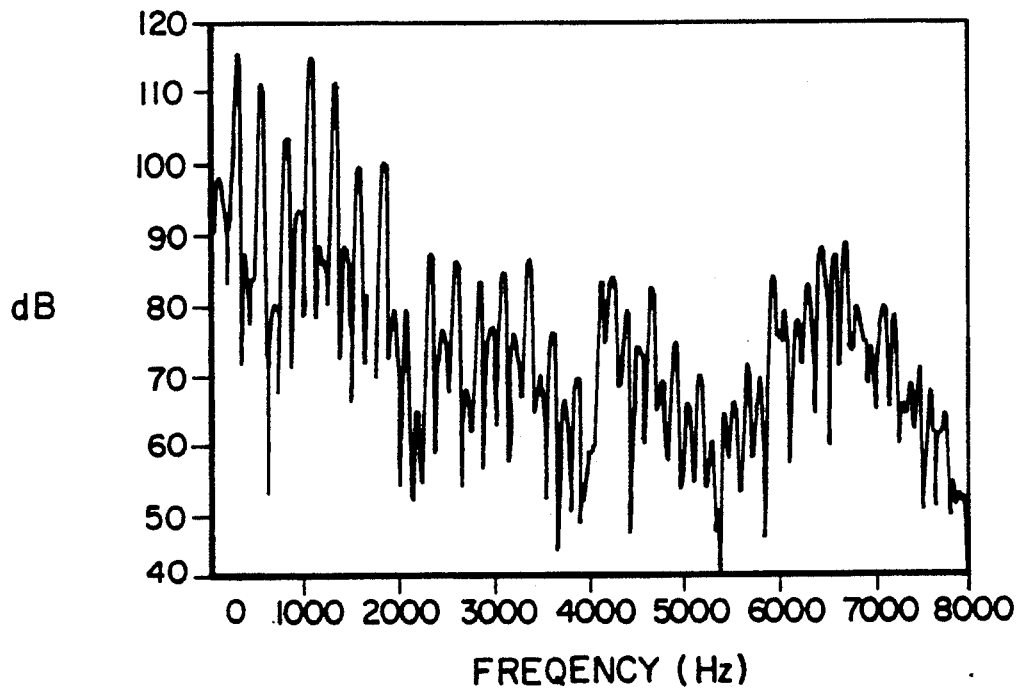
Figure 4:
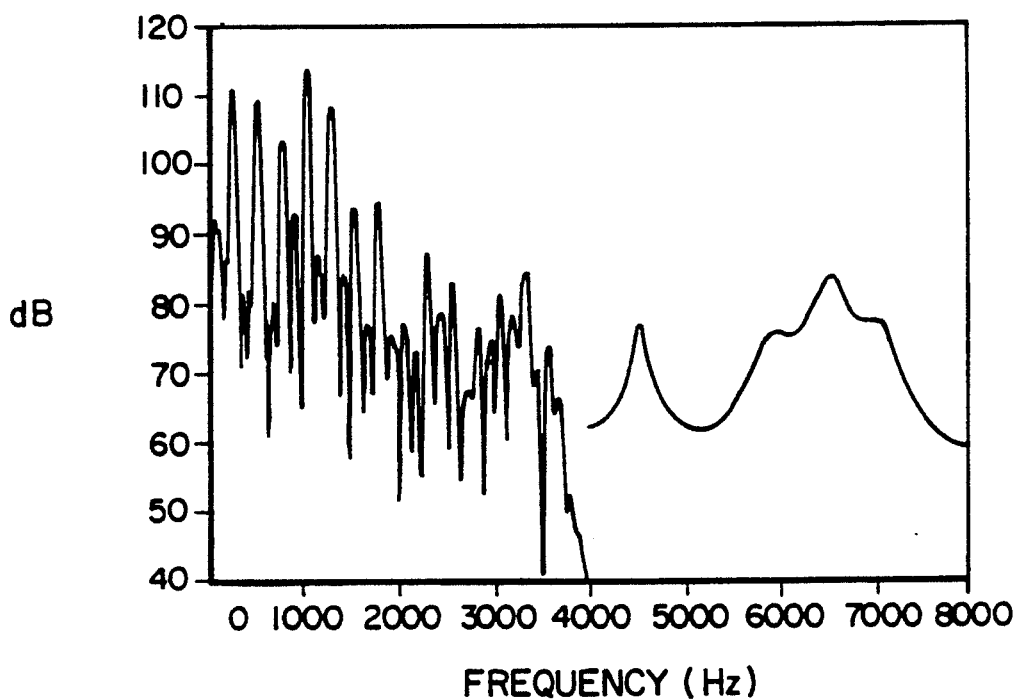

FIG. 3 shows by way of example a frequency spectrum of original speech occurring over a period of 30 ms, or one frame. FIG. 4 illustrates the frequency spectrum of the resultant information transmitted by the transmitter of FIG. 1. The low band below 4 kHz is transmitted as described above as a 7-bit mu-law encoded digital signal, and the shape or envelope of the high band is transmitted as the set of coefficients determining the frequency response of a filter.

Figure 5:
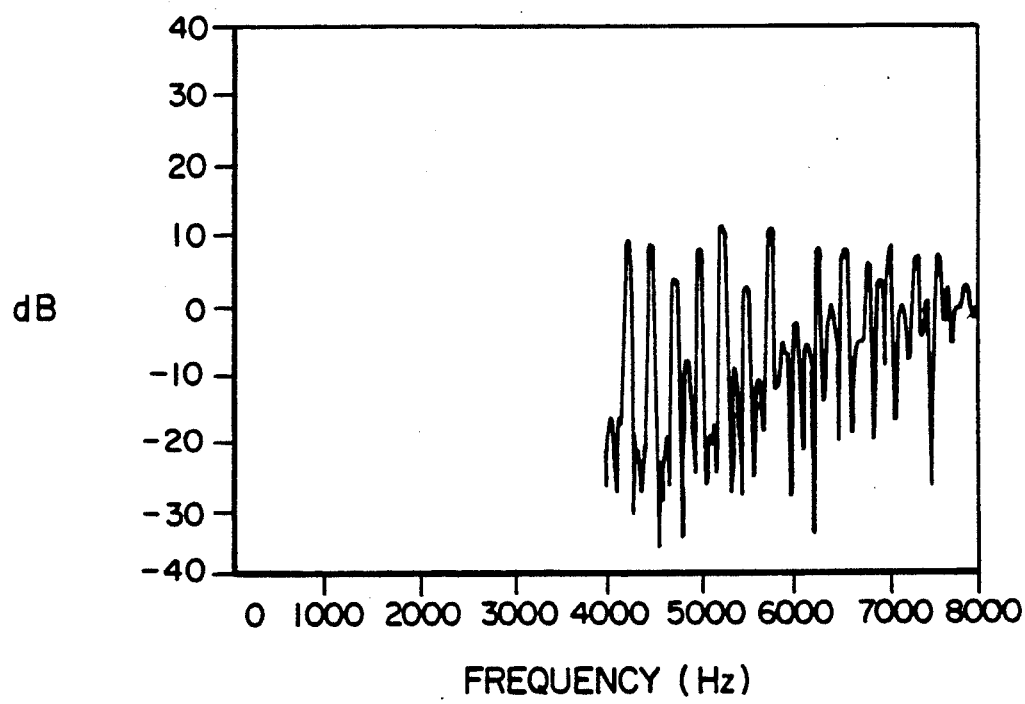
Figure 6:
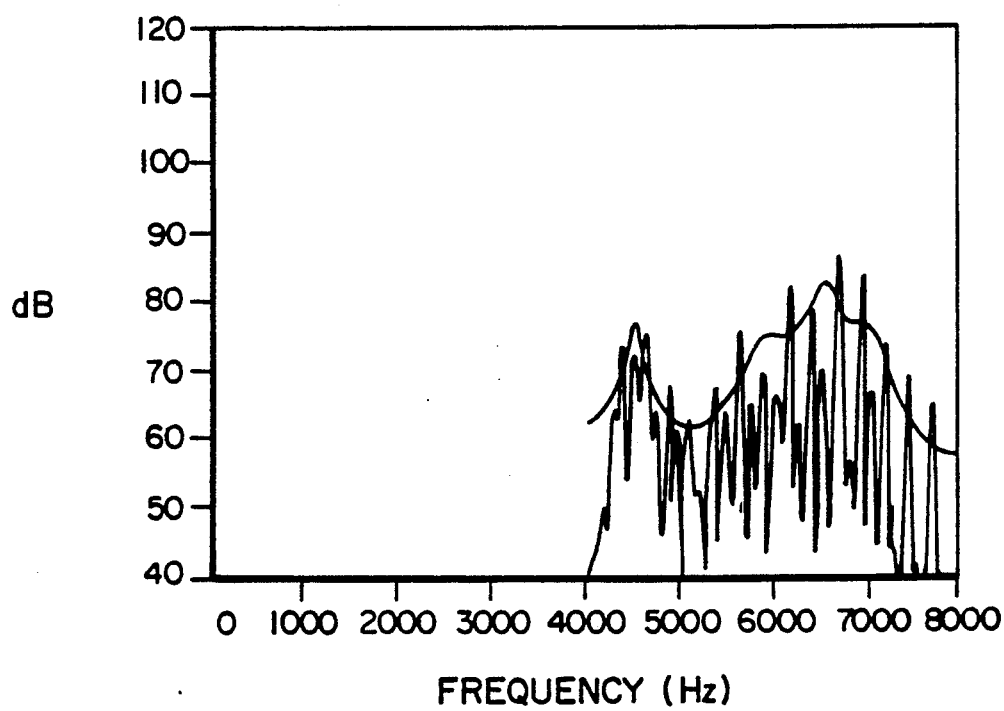

FIG. 5 illustrates the frequency spectrum of the resultant signal produced in the receiver on the lines 74, resulting from the LPC analysis of the low band signal samples and aliasing of this low band to the high band. FIG. 6 illustrates the spectrum of the resultant signal on the lines 78, produced by shaping the spectrum in FIG. 5 with the filter response shape, also shown in FIG. 6, represented by the transmitted high band coefficients. Finally, FIG. 7 illustrates the frequency spectrum of the resultant signal produced by the signal combiner 62 by adding the high band reproduced signal to the low band signal.

Figure 7:
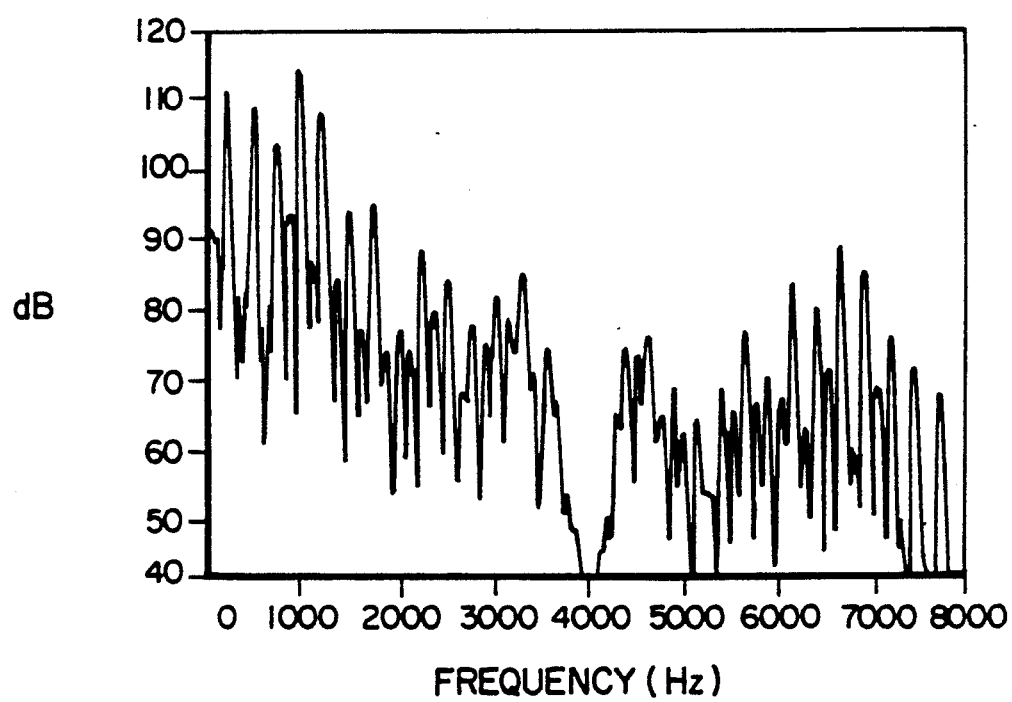

Whilst the frequency spectrum of the reproduced signal in FIG. 7 is not identical to that of the original signal in FIG. 3, nevertheless it contains a great deal of high band information which produces subjectively a vast improvement in the clarity and intelligibility of transmitted speech signals.

From the foregoing description the compatibility between the present arrangement and existing digital speech signal transmission arrangements should be fully appreciated In particular, it should be noted that the receiver of FIG. 2 is able to reproduce a conventional digital speech signal, and a conventional receiver is able to receive a digital speech signal produced by the transmitter of FIG. 1 with only a slight signal degradation due to the use of the least significant bits to convey the high band information. In each of these cases, of course, only the low band of the speech signal would be reproduced.

Whilst a particular embodiment of the invention has been described in detail above, the invention is not limited to the details and features of this, and numerous modifications, variations, and adaptations can be made without departing from the scope of the invention as defined in the claims.

In particular, it is observed that the manner of encoding and transmitting the high band information can be different from that described above, and in particular different framing formats and coefficient transmission arrangements may be used. In particular, the power information and/or the most significant coefficients could be transmitted more frequently than the less significant coefficients. In addition, the frame length may be changed. For example, it may be reduced to reduce the overall transmission delay, and/or the effective transmission rate of the high band information may be increased by decreasing the redundancy of the transmitted bits. For example, each high band information bit may be transmitted only three times consecutively instead of six times to double the effective transmission rate to 2.67 kbit/s.

It is also observed that techniques other than the particular LPC techniques described may be used to produce the high band information for transmission and to reproduce a high band signal. In particular, instead of the LPC analyzer 70 and LPC analysis filter 72 being used in the receiver to produce the signal on the lines 74 for shaping in the filter 76, the signal on the lines 74 could be produced by a non-linear technique such as center-clipping or rectification of the low band signal.

What is claimed is:

1. A method of transmitting components of a signal in a high band of frequencies, above a predetermined frequency, on a digital transmission channel which carries components of the signal in a low band of frequencies, below the predetermined frequency, in the form of signal samples sampled at a rate of twice the predetermined frequency, comprising the steps of:

deriving from the signal bits of information relating to the high band signal components; and transmitting said bits of information in place of the least significant bit of the samples.

2. A method as claimed in claim 1 wherein each of said bits is transmitted redundantly in place of the least significant bit of a plurality of consecutive samples.

3. A method as claimed in claim 1 wherein each of said bits is transmitted redundantly in place of the least significant bit of three consecutive samples.

4. A method as claimed in claim 1 wherein each of said bits is transmitted redundantly in place of the least significant bit of six consecutive samples.

5. A method as claimed in claim 1 wherein said bits of information relating to the high band signal components are transmitted in frames of the replaced least significant bits of the samples, each frame comprising a frame synchronizing bit and a plurality of information bits, each frame having a predetermined duration, and the information bits in each frame relating to high band components which occur during a period corresponding to said predetermined duration.

6. A method as claimed in claim 5 wherein the plurality of information bits in each frame include bits representing a plurality of filter coefficients.

7. A method as claimed in claim 6 wherein the plurality of information bits in each frame further include bits representing a power level of the high band signal components.

8. A method as claimed in claim 6 wherein the bits representing the plurality of filter coefficients are produced by linear predictive coding of the high band signal components.

9. A method as claimed in claim 5 wherein the frame synchronizing and information bits are each transmitted redundantly in each frame in place of the least significant bit of a plurality of consecutive samples.

10. A method as claimed in claim 5 wherein the frame synchronizing and information bits are each transmitted redundantly in place of the least significant bit of three consecutive samples.

11. A method as claimed in claim 9 wherein the frame synchronizing and information bits are each transmitted redundantly in place of the least significant bit of six consecutive samples.

12. A method as claimed in claim 10 wherein the predetermined frequency is 4 kHz and the digital transmission channel has a bit rate of 64 kbit/s.

13. A method as claimed in claim 11 wherein the predetermined frequency is 4 kHz and the digital transmission channel has a bit rate of 64 kbit/s.

14. A method of transmitting components, at frequencies above 4 kHz, of a speech signal on a digital transmission channel via which eight-bit samples of the speech signal at a sampling rate of 8 kHz are transmitted, comprising the step of replacing an eighth least significant bit of each sample with a bit of information derived from the speech signal components at frequencies above 4 kHz.

15. Apparatus for transmitting signal components of a speech signal in high and low bands of frequencies respectively above and below a predetermined frequency, comprising:

means for producing digital samples of speech signal components in the low band at a sampling rate of twice the predetermined frequency for transmission, each sample comprising eight bits including a least significant bit;

means for producing, from the speech signal, bits of information relating to speech signal components in the high band; and means for replacing the least significant bit of each sample with a bit of information relating to speech signal components in the high band.

16. Apparatus as claimed in claim 15 wherein the means for producing bits of information relating to speech signal components in the high band comprises linear predictive coding means.

17. Apparatus as claimed in claim 15 wherein the means for replacing the least significant bit of each sample with a bit of information relating to speech signal components in the high band comprises means for replacing the least significant bit of each of a plurality of consecutive samples with the same bit of information relating to speech signal components in the high band.

* * * * *